(12) United States Patent
Hetzel et al.

(10) Patent No.: US 8,606,382 B2
(45) Date of Patent: Dec. 10, 2013

(54) SYSTEM AND METHOD FOR TRANSFERRING NON-COMPLIANT PACKETIZED AND STREAMING DATA INTO AND FROM A MULTIMEDIA DEVICE COUPLED TO A NETWORK ACROSS WHICH COMPLIANT DATA IS SENT

(75) Inventors: Herbert Hetzel, Schweigen-Rechtenbach (DE); David J. Knapp, Austin, TX (US)

(73) Assignee: Standard Microsystems Corporation, Hauppauge, NY (US)

(*) Notice: Subject to any disclaimer, the term of this patent is extended or adjusted under 35 U.S.C. 154(b) by 836 days.

(21) Appl. No.: 12/698,296

(22) Filed: Feb. 2, 2010

(65) Prior Publication Data
US 2010/0135309 A1 Jun. 3, 2010

Related U.S. Application Data

(62) Division of application No. 10/859,470, filed on Jun. 2, 2004.

(51) Int. Cl.
*G06F 17/00* (2006.01)
(52) U.S. Cl.
USPC .......................................................... 700/94
(58) Field of Classification Search
CPC .. H04R 5/04; H04R 2420/00; H04R 2420/01; H04R 2420/13; H04R 2420/07; H04R 2420/09; H04R 2227/003; H04R 2227/005; G06F 3/162; G06F 3/165
USPC .......................................................... 700/94
See application file for complete search history.

(56) References Cited

U.S. PATENT DOCUMENTS

| 4,612,635 A | 9/1986 | Leete |
| 5,469,432 A | 11/1995 | Gat |

(Continued)

FOREIGN PATENT DOCUMENTS

| EP | 0569160 | 11/1993 |
| JP | 05-174640 | 7/1993 |

(Continued)

OTHER PUBLICATIONS

European Search Report, EP05011315, mailed Aug. 5, 2005.

(Continued)

*Primary Examiner* — Paul McCord
(74) *Attorney, Agent, or Firm* — Kevin L. Daffer; Daffer McDaniel LLP

(57) ABSTRACT

A communication system, network, interface, and port architecture are provided for transporting different types of data across a network. The network can be arranged by connecting the ports in a daisy chain fashion to achieve a ring architecture or topology. The network forwards data according to a specific network protocol, and any incoming data that follows that protocol will be sent onto the network. If the incoming data protocol does not match the network protocol, then the incoming data is not sent immediately to the network, but instead is sent to an input pin of a device upon the network specifically designed to receive that incoming data. The network, therefore, has ports that support both compliant and non-compliant incoming data, and the devices that produce such data. Examples of non-compliant data include any data which does not time-division multiplex different asynchronous, isochronous, and synchronous data in dedicated channels within each frame, and which have a preamble, coding, frequency, or overall protocol different from that which is established for network transfer.

15 Claims, 9 Drawing Sheets

(56) References Cited

U.S. PATENT DOCUMENTS

| | | | |
|---|---|---|---|
| 5,493,650 A * | 2/1996 | Reinke et al. | 709/225 |
| 5,544,228 A * | 8/1996 | Wagner et al. | 379/67.1 |
| 5,577,044 A | 11/1996 | Oxford | |
| 5,604,738 A * | 2/1997 | Shibata et al. | 370/264 |
| 5,638,518 A | 6/1997 | Malladi | |
| 5,684,954 A | 11/1997 | Kaiserswerth et al. | |
| 5,864,677 A | 1/1999 | Van Loo | |
| 6,055,225 A | 4/2000 | Wu | |
| 6,055,228 A | 4/2000 | DeKoning et al. | |
| 6,201,787 B1 * | 3/2001 | Baldwin et al. | 370/222 |
| 6,437,710 B1 | 8/2002 | Tam et al. | |
| 6,611,537 B1 | 8/2003 | Edens et al. | |
| 6,643,291 B1 | 11/2003 | Yoshihara et al. | |
| 6,763,030 B1 | 7/2004 | Regev et al. | |
| 6,865,188 B1 | 3/2005 | Stirling et al. | |
| 6,904,053 B1 * | 6/2005 | Berman | 370/466 |
| 7,047,330 B2 | 5/2006 | Kovacevic | |
| 7,054,448 B2 | 5/2006 | Yoshino et al. | |
| 7,082,557 B2 * | 7/2006 | Schauer et al. | 714/716 |
| 7,100,020 B1 | 8/2006 | Brightman et al. | |
| 7,101,089 B2 * | 9/2006 | Sohmura et al. | 385/88 |
| 7,324,857 B2 | 1/2008 | Goddard | |
| 7,397,788 B2 | 7/2008 | Mies et al. | |
| 7,400,637 B1 | 7/2008 | Chapman | |
| 7,512,244 B2 | 3/2009 | Becker et al. | |
| 2002/0067738 A1 | 6/2002 | Su et al. | |
| 2002/0072816 A1 | 6/2002 | Shdema et al. | |
| 2002/0141421 A1 * | 10/2002 | Dupont | 370/403 |
| 2002/0159602 A1 | 10/2002 | Yoshino et al. | |
| 2003/0041161 A1 * | 2/2003 | Billings et al. | 709/231 |
| 2003/0156218 A1 * | 8/2003 | Laksono | 348/388.1 |
| 2003/0161297 A1 | 8/2003 | Noda et al. | |
| 2003/0212999 A1 * | 11/2003 | Cai | 725/119 |
| 2003/0215244 A1 | 11/2003 | Norizuki et al. | |
| 2003/0225953 A1 | 12/2003 | Ho | |
| 2004/0003108 A1 | 1/2004 | Knapp et al. | |
| 2004/0032922 A1 | 2/2004 | Knapp et al. | |
| 2004/0091028 A1 * | 5/2004 | Aronson et al. | 375/219 |
| 2004/0114612 A1 | 6/2004 | Even et al. | |

FOREIGN PATENT DOCUMENTS

| | | |
|---|---|---|
| JP | 07-177590 | 7/1995 |
| JP | 09-036905 | 2/1997 |
| JP | 2002-330500 | 11/2002 |
| JP | 2004-048658 | 2/2004 |
| WO | 98/58475 | 12/1998 |
| WO | 03/058946 | 7/2003 |

OTHER PUBLICATIONS

Harshbarger et al., "Networking for Audio, Part 3: CobraNet," © 2002 Peavey Electronics, pp. 1-2.

Office Action mailed Nov. 13, 2012 for JP Patent Application No. 2011-082563.

Office Action mailed May 14, 2013 for JP Patent Application No. 2011-082563.

* cited by examiner

SYSTEM AND METHOD FOR TRANSFERRING NON-COMPLIANT PACKETIZED AND STREAMING DATA INTO AND FROM A MULTIMEDIA DEVICE COUPLED TO A NETWORK ACROSS WHICH COMPLIANT DATA IS SENT

CONTINUING DATA

The present application is a divisional from prior U.S. patent application Ser. No. 10/859,470 filed Jun. 2, 2004.

BACKGROUND OF THE INVENTION

1. Field of the Invention

This invention relates to a communication system and, more particularly, to a synchronous communication system formed as a ring network of two or more ports coupled in daisy chain fashion to one another to allow communication to and from a external multimedia device coupled to at least one port of the network to complete the ring. The ports are preferably associated with a single multimedia device, and the network is formed between ports of the device to which the external multimedia device is coupled so that the port can accommodate data that conforms to a particular protocol used by the network (i.e., complaint data), or the port can accommodate non-compliant data as asynchronous Ethernet-based packets of data, synchronous or isochronous data, analog data, and/or Sony/Philips Digital Interface Format ("SPDIF") data.

2. Description of the Related Art

A communication system is generally known as a system that permits communication between nodes interconnected by a transmission line. Each node can transmit information, or can transmit and receive information, across the transmission line. The communication system of interconnected nodes can be organized in various topologies, such as bus, ring, star, or tree topology.

A bus topology network is generally regarded as linear, where transmissions from one node propagate the length of the transmission line and are received by all other nodes connected to that bus. A ring topology network, however, generally consists of a series of nodes connected to one another by unidirectional transmission links to form a single, closed loop. Examples of a ring network are described in IEEE 802.5 and Fiber Distributed Data Interface (FDDI).

The transmission line between nodes can be either wired or wireless. It is preferred that the transmission line accommodate different types of data. Unfortunately, certain portions of a network may be tailored to sending bursts of data, such as TCP/IP across Ethernet, while other portions may be called upon to send streaming data, such as audio and video data. It would be desirable to introduce a network that can transfer both types of information, in whatever form, upon the network. Moreover, it would be desirable to use, for example, copper wire, fiber optic, or wireless transmission medium for the chosen transmission line.

Ethernet and IEEE 802.03 specify a particular protocol in which packets of data can be sent between computing systems. Ethernet can sense multiple access collisions and can arbitrate which source device will gain mastership over the transmission line. Ethernet operates at the lowest levels of the OSI reference model, normally reserved for the data link and physical link layers. The Ethernet protocol specifies a particular frame format of a preamble, followed by a destination address and a source address, and then the data payload. The data is generally encoded in a 4B/5B or 8B/10B encoding structure prior to the data being sent across the coax or twisted pair transmission line.

The encoded packets of data sent within an Ethernet frame generally have no time relationship relative to each other. For example, a computer can send a burst of data in several successive frames, and then a considerable amount of time might pass before the next burst of data is sent. Bursty or packetized data need not be sent as real-time, time-related data since the packets are typically stored and used later by the destination device.

Conversely, streaming data has a temporal relationship between samples produced from a source port onto the network. That relationship between those samples must be maintained across the transmission line to prevent perceptible errors, such as gaps or altered frequencies. A loss in the temporal relationship can cause a receiver at a destination to experience jitter, echo, or in the worst instance, periodic blanks in the audio and video stream.

Packetized TCP/IP data, for example, placed in an Ethernet frame need not maintain the sample rate or temporal relationship of that data and networks that send packetized data typically send that data at whatever rate the source device operates. Thus, a network that forwards packetized data is generally considered as an asynchronous network. Conversely, a network that forwards streaming data is generally synchronous, with each source and destination node sample at a rate synchronous to the network.

While streaming data is typically sent synchronously across a network, there may be instances in which the sample rate (fs) local to a node is not at the same frequency as the frame synchronization rate (FSR or FSY) of the transmission line. If this is the case, then the data streaming from a source device can be sample rate converted, and then sent synchronously across the network. Alternatively, the data can be sent isochronously across the network.

There are various types of sample rate converters available on the market. For example, Analog Devices Corp. offers part no. AD1896 to convert the sample rate offered by the local clock to another sample rate synchronous to, for example, another clock associated with the network, for example. Either increasing or decreasing the sample rate would be beneficial if a system can be employed that can match fs to FSY. Sample rate conversion, however, oftentimes involves fairly complex algorithms for comparing fs to FSY, and generally a digital signal processor (DSP) is used at the source node. If, for example, the source node contains compressed data, such as AC3 data streaming from a DVD, the compressed data must be decompressed before the data is sample rate converted. Unfortunately, sending decompressed data consumes more network bandwidth than sending compressed data.

It would be desirable to implement an improved communication system or network. The improved network should be one that can accommodate streaming data in either synchronous or isochronous form. The data streaming from a source node should be sent isochronously rather than sample rate converted. Moreover, the improved network should also accommodate packetized data in order to interface computing systems, such as computers and interactive televisions, to streaming audio and video data accessible by such systems.

FIG. 1 illustrates a system made up of nodes that send and receive packetized and streaming data yet, however, communication between such nodes is limited due to the constraints of the different protocols by which data is transferred. As shown, a communication system 10 might have an audio/video receiver 12. Receiver 12 operates essentially as a dualpurpose switch or "hub" for streaming data sent between, for example, an MP3 player 14, an audio tuner 16, a DVD player (or DVR) 18, and CD player 20. Receiver 12 can receive the streaming data from the various players or inputs and forward the serial bitstream after processing to, for example, an amplifier, speakers 22, and/or digital television 24.

The information sent from the various devices 14-20 can be sent to receiver 12 as analog data or digital data. A popular format for digital data is the Sony/Phillips Digital Interface Format (SPDIF). SPDIF was established by the Audio Engineering Society (AES) in conjunction with the European Broadcasting Union (EBU) to create a standard interface known as the AES/EBU interface. The interface constitutes a serial transmission format for linearly-represented, digital audio data. The format is generally independent of sampling frequency, but three sampling frequencies are nonetheless recommended by AES for pulse code modulated (PCM) application: 32 kHz, 44.1 kHz, and 48 kHz. The SPDIF protocol and frame structure is well documented as a series of 16-bit bytes, beginning with control and category codes, as well as the source number and channel number by which data is transferred from a digital source, such as a CD, DVD, or MP3 player.

The SPDIF protocol can, for example, be used by a digital television (DTV) 24, and a packet hub 26 can be used to combine packetized data from, for example, a digital video broadcast (DVB) receiver sometimes known as a set top box 28. Certain commands broadcast from the set top box 28 can be forwarded to hub 26, while streaming data is forwarded to the audio video receiver 12. The command signals that emanate from set top box 28 can be sent as, for example, TCP/IP data within the network layer of the OSI model, which is then wrapped with the Ethernet protocol, recognizable to hub 26. Along with the Ethernet packets from the set top box 28 and digital television 24, hub 26 can also receive Ethernet packets from a personal computer (PC) 30. The packets of information processed by hub 26, therefore, can constitute control information.

It may be desirable to implement interactive television processing in multiple rooms throughout a user's home, or in different homes or locations. For example, another DTV 32 can be situated in a second room, separate and apart from DTV 24 placed in a first room. Alternatively, DTV 32 can be a computer laptop carried outside the home in which DTV 24 resides. Similar to DTV 24, an audio amplifier 34 might form a part of DTV 32 or be built outside DTV 32 and, as shown, receives either digital or analog information. If in digital form, the information can be sent possibly in SPDIF format to amplifier 34, which then processes the digital information and outputs the information to the appropriate left and right speakers, or multiple surround speakers 36.

A prevalent problem with home or consumer audio/video electronics is the rapid advances in digital interaction to those electronics via, for example, PCs. Interacting home electronics with PCs is difficult at best simply due to the differences between asynchronous networks and synchronous networks. Network 10 of FIG. 1 attempts to combine asynchronous, packet-processing nodes or devices with synchronous, streaming nodes or devices. However, the streaming information cannot be reliably sent to DTV 32 if DTV 32 cannot gain mastership of the asynchronous bus 38. This will entail possible loss of streaming data upon DTV 32.

There have been attempts to overcome the problem of interfacing asynchronous transmission lines to synchronous transmission lines in order to network audio and video data. For example, a product known as CobraNet attempts to eliminate the dropouts and discontinuities of streaming data sent across an asynchronous network. CobraNet providers recommend using dedicated Ethernet network for audio, and another dedicated Ethernet network for the packetized data. See, Harshbarger and Gloss, "Networking for Audio, Part 3," 2004, herein incorporated by reference. Requiring two separate Ethernet networks and maintaining the asynchronous protocol between nodes substantially increases the overhead of the network, and the complexity of software and hardware drivers used by that network.

It would be desirable to introduce a network that can transfer streaming data (both isochronous and synchronous streaming data), as well as packetized TCP/IP data and control data simultaneously across a network. It would also be desirable to send the various types of data across a network that is clocked at the same rate for all such types of data. Thus, the desired network is a synchronous network where sampled, streaming data is cognizant of the network transfer rate, and packetized data is placed onto the network at the network transfer rate. Moreover, the improved network avoids utilizing two transmission paths for audio information and packetized data. Any multimedia device which streams data or sends bursts (packets) of data can be formatted and time-slotted onto the desired communication system and network.

SUMMARY OF THE INVENTION

The problems outlined above are in large part solved by a communication system and network made up of a multimedia device having ports coupled together to complete a network to which a second multimedia device can be coupled. Each port is used to determine whether an incoming bitstream from the second device is in compliance with the network protocol or not. If so, then the compliant data is forwarded into the appropriate time slot of the network packet. If not, then the non-compliant data is not directly placed onto the network but instead is recognized by an input of the first device specifically designed to accept the non-compliant data. An interface within the port can be used to reformat, if needed, the non-compliant data and to output it from the first port and into a bypass input of a second port via the ring network. The output from the first port is coupled onto the network path through a bypass output pin of the first port.

As used herein, a multimedia device is any device that sends or receives data in whatever form. Examples of multimedia devices include multimedia hubs, switches and audio processors (i.e., audio and/or video receivers), computers, amplifiers, speakers, multimedia players (i.e., CD players, DVD players, MP3 players etc.), multimedia recorders (i.e., VCRs, DVRs, etc.), and GPS systems. The term multimedia device is henceforth referred to simply as a device.

The network protocol used by the present system involves a preamble that establishes a channel between a source device and a destination device, where the destination device can be any device connected to the network of interconnected devices that is configured in a ring topography. Each frame following the preamble consists of a time-division multiplexed set of fields reserved for respective channels of communication. For example, the first field might be reserved for synchronous streaming data, the second for streaming isochronous data, the third for packetized data, and the fourth for control data. Thus, multimedia devices coupled to the ring can send in each frame at least one type of data. The frame transfer rate (FSY) is synchronized to the sample rate or, alternatively, if the sample rate is higher or lower than FSY, then streaming data can be sent isochronously within a particular time slot or channel, established about the ring network. Therefore, each frame sends contiguous channels of streaming data from a source device to a destination device, without time-interruption between frames. As the streaming data is sampled on the source device, it is sent in real-time across the network within one of possibly N number of channels or fields within a frame, sent at the same rate or possibly integer multiples of fs.

The protocol used by the synchronous network hereof involves specific time-division, multiplexed channels reserved in each and every frame. Each channel is designated for a particular type of data transfer, whether the data type is synchronous, isochronous, packet, or control data. In order to interface with that network protocol, it is imperative to recognize incoming data from a multimedia device as either data that falls within that protocol or outside of that protocol. Data which is timed relative to a frame sync pulse, or FSY, as a particular type of data offset in time from the FSY pulse for a designated time slot (i.e., time-division, multiplexed channel) will be compliant with the network protocol. Otherwise, the incoming data will not be recognized as being within one of the time-division, multiplexed channels reserved for a particular type of data within that channel, and thus is non-compliant. There are multimedia devices that can send non-compliant and/or compliant data and are referred to as non-compliant device or compliant devices, respectively.

A digital-to-analog converter (DAC) typically sends analog signals modulated possibly according to frequency that is dissimilar to the frequency used by the synchronous network. Typically, analog signals range somewhere near 20 Hz-20 kHz, or possibly wider, but certainly much less than the transfer rate of the network which can be much higher than 30 kHz and, more preferably, 44.1 kHz or 48 kHz. Although SPDIF data can be sent at 44.1 kHz or 48 kHz, SPDIF data uses a preamble that is dissimilar from the preamble of data sent across the network. Also, SPDIF data is not time-slot allocated in accordance with the network protocol that accommodates multiple types of streaming and packetized data. Still further, packets of data sent according to the Ethernet protocol use a protocol different from that used by the network since TCP/IP data within the Ethernet packet is not targeted for a specific time slot of a frame that is regularly sent at an FSY rate, nor is the preamble for packetized data sent as broadcast channels synchronously across the network.

Analog signals, Ethernet packets, and SPDIF data are transferred at a variable frequency different from the network, transferred at a frequency asynchronous to the network, and/or transferred using a preamble or coding algorithm altogether different from the compliant packets sent across the network. Thus, analog, packetized, and SPDIF data, and possibly other types of data, not consistent with the frequency, amplitude, preamble and coding of the network packets/frames (i.e., the network protocol) are herein referred to as non-conformal or non-compliant data. Multimedia devices that send non-compliant data are, therefore, referred to as non-compliant devices or simply "legacy" devices.

Until the legacy devices can transfer data in the appropriate time slot and at the network transfer rate, the present network implements a port that will accommodate the legacy devices and their associated data bitstreams. However, some devices may comply with the network and, therefore, the port can also recognize complaint devices and their associated data bitstreams. The present network and communication system can connect multimedia devices with one another to form a ring, with each device connected to a port that can recognize and appropriately direct either compliant or non-compliant data sent from each device. The port can receive incoming data from a compliant device onto the network, or can receive incoming data from a non-compliant device into a pin designated to receive the non-compliant data.

According to one embodiment, a pair of communication ports is provided. Both ports can be associated with a first multimedia device. The first port has a first port receive input, a first port bypass input, and a first port output. The second port has a second port receive input, a second port bypass input, and a second port output. The first port output is coupled to the second port bypass input to form a network among the pair of ports (first and second ports). The network allows a second multimedia device to couple incoming data onto the network path and/or communicate with the first multimedia device associated with the first and second ports. If the incoming data from the second multimedia device is conforming to (i.e., is complaint data), then the incoming data can be placed into an appropriate timeslot of the network frame, and the data continues through the first port from the first port bypass input to the first port output, and then into the second port bypass input to the second port output, and back around to the first port bypass input—if only two ports are provided. If the incoming data is not complaint, then the incoming data is placed into an input of the first multimedia device specifically designated to receive this data, and meanwhile the network continues from the first port bypass input to the first port output, which includes the first port bypass output. The pin is one that preferably receives serial data and, once the non-compliant serial data is processed, it can be reformatted by an interface circuit or system within the first port, if desired, to a format that is compatible with the network protocol. Thus, the reformatted, non-complaint data can be made complaint after it is processed by an interface circuit associated with the first port. Other ports of the network have a similar interface circuit, which preferably comprises a digital signal processor (DSP) that processes the incoming data and a physical layer transceiver device, or controller, that reformats the incoming data to make it complaint to a particular time slot reserved for that type of data.

According to one embodiment, the first port associated with the first device can compare the protocol and a time-division structure of each frame of data transferred across a ring network through the first port, second port, and so forth associated with the first device with the protocol of the incoming data from the second device to determine if the incoming data is compliant with the network protocol. If it is, then the incoming data is said to be sent from a compliant device. If it is not compliant, then the incoming data is sent from a non-compliant, legacy multimedia device. SPDIF, analog signals, and packetized (i.e., Ethernet) data is typically regarded as non-compliant data from non-compliant devices.

A port of the first device can accommodate incoming data from either a compliant or non-compliant device. If it is desirous to connect both compliant and non-compliant devices to the first device, then preferably the first device includes two ports: one port for each connection. The two ports are connected through bypass input/outputs so that each port includes two inputs (a receive input for receiving incoming data and a bypass input) and two outputs (a transmit output for sending outgoing data and a bypass output). The bypass output is coupled to a bypass input of the next port within the series of ports. The bypass output from the last port in the series is coupled to a bypass input of the first port in the series to complete the ring network.

Each port includes an auto detect detector/comparator and multiplexer circuit operably coupled to compare the data sent across the network to incoming data, and forward the incoming data onto the network via a bypass output if the incoming data is in a format similar to the network protocol. The port might include a phase-locked loop having a frequency multiplier and divider for slaving a sampling rate of incoming data to a transfer rate of the data sent across the network. Alternatively, at least one bit can be sent with the incoming data representative of a phase difference between the phase of the incoming data and the phase of data sent across the network. The phase difference information contained in the bit value can then be used, along with the data transfer rate of the network, to recompile a sampling rate at the destination node, or device. In instances in which a phase-locked loop exists at the source and destination, slaved from the network transfer rate, represents operation in a locked isochronous mode of transfer. Instances in which at least one bit is sent along with the data across the network representing phase differences is referred to as an unlocked isochronous mode of transfer. Regardless of which mode of operation is chosen, data can be sent isochronously across the network if the sample rate on the source or destination device is different from FSY of the network.

According to yet another embodiment, a communication system is provided that includes a first device having a first port that includes a first port receive input and a first port transmit output. A second multimedia device has a second port that includes a second port receive input and a second port transmit output. The first port receive input and second port transmit output are coupled together to transfer digital data and right analog audio data. The second port receive input and first port transmit output are coupled together to transfer digital data and left analog audio data. The first device can include an analog-to-digital converter (ADC), whereas the second device can include a digital-to-analog converter (DAC), or vice versa. The first device can also include a third port. The first port can include a first port bypass input and a first port bypass output, and wherein the third port can include a third port bypass input and third port bypass output. The first port bypass output is preferably coupled to the third port bypass input. The first port can further include a serial input pin and a multiplexer. The serial input can be a pin on an interface circuit that includes a processor, into which all incoming data is sent. The serial input receives all incoming data, including non-compliant data. The right analog audio data and/or the digital data placed into the first port receive input can be directed to either the serial input pin, if compliant data, or onto the first port bypass output via placement into a receive input on the interface circuit, if non-compliant data.

BRIEF DESCRIPTION OF THE DRAWING

Other objects and advantages of the invention will become apparent upon reading the following detailed description and upon reference to the accompanying drawings in which.

Figure 1:
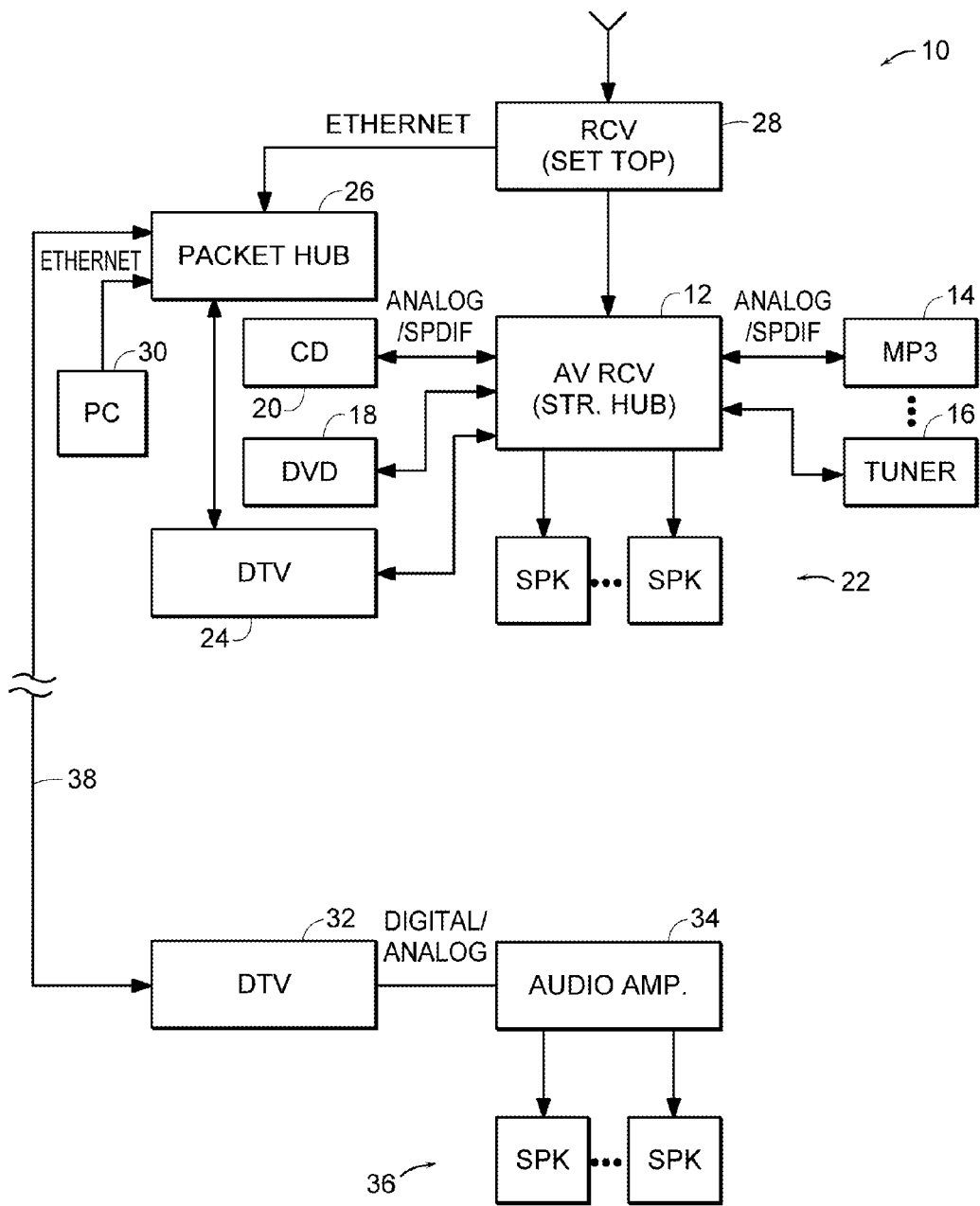
FIG. 1 is a block diagram of various devices coupled together in an unsuccessful attempt to send streaming and packetized data therebetween.

While the invention is susceptible to various modifications and alternative forms, specific embodiments hereof are shown by way of example in the drawings and will herein be described in detail. It should be understood, however, that the drawings and detailed description thereto are not intended to limit the invention to the particular form disclosed, but on the contrary, are intended to cover all modifications, equivalents, and alternatives falling within the spirit and scope of the present invention as defined by the appended claims.

DETAILED DESCRIPTION OF PREFERRED EMBODIMENTS

It is recognized that one or more multimedia devices can sample data at a higher sampling rate (fs) than the frame sync rate (FSY) of a transmission line. For example, a multimedia device can be a CD player that samples at approximately 44.1 kHz. The CD player can stream data at, for example, 16 bits per sample audio channel (32 bits/stereo channel), therefore, resulting in a bps Baud rate across the transmission line of 32 bits/stereo sample×44.1 K samples/second=1.4112 Mbps.

The non-return to zero ("NRZ") data from the device can be encoded in several ways. Data can also be encoded using, for example, the well known Miller encoding technique.

Alternative encoding includes bi-phase encoding, or encoding so that the encoded bit stream does not incur an accumulated DC value. The latter encoding mechanism is oftentimes referred to as DC-adaptive or DC-free encoding, and is described in U.S. Pat. No. 6,437,710 herein incorporated by reference. If FSY across the transmission line is different than the sample rate fs, then the streaming data from the multimedia device cannot be placed synchronously through the transmission line to another device (i.e., from a DVD player to a speaker). Instead, the streaming data must be placed as isochronous streaming data as opposed to synchronous streaming data. Other types of data as described above can also be placed across the network.

Figure 2:
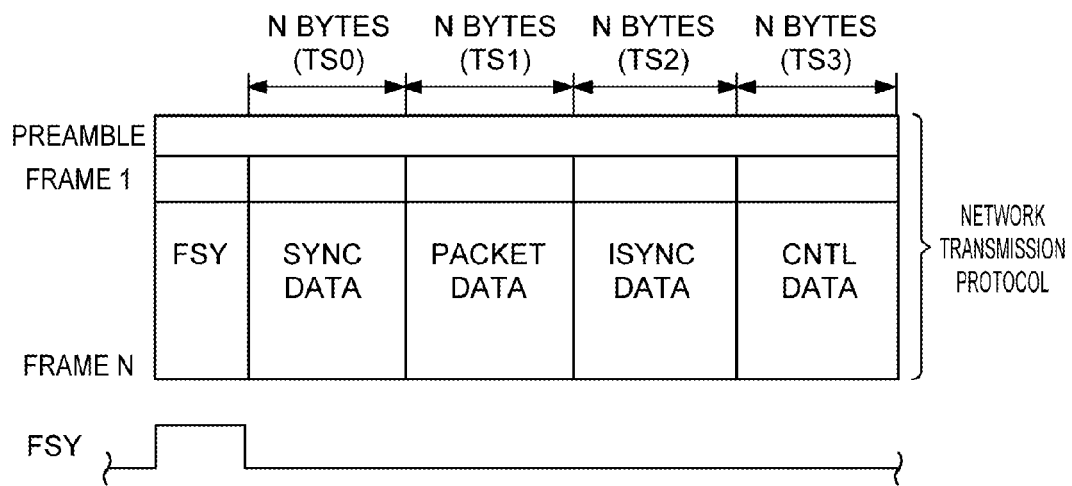
FIG. 2 is a plan diagram of a protocol used to send multiple frames of complaint data across a network based on time slots reserved for each type of data.

Asynchronous data or packetized data can be arranged as datagrams, using the Transmission Control protocol (TCP) and the Internet protocol (IP). TCP/IP are the fragmented datagrams placed in an IP packet format. However, when the TCP/IP packet is forwarded across a network, the transport and networking layer of the OSI reference model can be sent according to a data layer or physical layer of the OSI reference model according to, for example, the Ethernet protocol. The datagrams alone can be removed from the Ethernet protocol and sent using a different protocol if desired. FIG. 2 illustrates TCP/IP datagrams along with other types of data sent using a network transmission protocol indigenous to the present network.

Turning now to the drawings, FIG. 2 illustrates a format by which different types of data are sent across a network within each and every frame being transferred. Following a preamble synchronized to a byte-wide FSY, a protocol can be established within the preamble designating certain channels formed between a master and slave unit connected to the network. Thereafter, each frame begins with an FSY byte value that is uniquely discernable, such as a coding violation, followed by a first time slot dedicated to receiving synchronized data, and second time slot dedicated to receiving packetized data, a third time slot dedicated to receiving isochronous data, and a fourth time slot dedicated to receiving control data.

Each time slot represents a channel. For example, there may be four channels within a frame structure of 64 bytes, and each channel can have a minimum of 2 bytes. If each channel has the same number of bytes, then the 64 bytes can be broken into 16 bytes each that repeats at an audio sample rate of a device connected to the network via a node. For instance, if the audio sample rate is 48 kHz, the total bit rate of the network between any two nodes is 48 K/frames sec.×64 bytes/frame×8 bits/byte=24.576 Mbits/sec.

When a device is activated or "powered up," routing tables are broadcast across the control channel to each of the other devices upon the network. The control channel contains configuration (or reconfiguration) routing tables needed to accommodate data transfer between the newly activated device(s). The routing table is, therefore, created to accommodate all of the various channels or frame portions established to receive the various types of data, thereafter synchronously sent across the network between activated devices. The routing table within a memory medium of, for example, a DSP will then identify which bytes within a frame is associated with a particular channel when subsequent communication is desired.

Thus, for example, if a DVD is on one channel and a CD on another channel, the routing table will actually assign time slots to those channels. In this fashion, the DVD player will send audio and video information within a first channel, yet the CD player will send audio information within a second channel allocated according to time slots. If the network transfer rate is 48 kHz, then a DVD player that samples at 48 kHz and a CD player that samples at 44.1 kHz will allocate the synchronous data channel to the DVD player, and the isochronous data channel to the CD player.

Isochronous data can have, for example, a variable channel length also established within the routing tables when, for example, a computer connected to the network comes on-line. For example, if an isochronous transfer requires an additional byte within successive frames (shown in FIG. 2 as N+1 bytes), then the routing table will assign that byte when, for example, a high frequency sampled DVD player comes on-line and is activated to a network previously locked to a lower transfer frequency. A decoder will recognize and decode the synchronization byte (FSY) and forward the control byte to the processor, which then updates the routing table within the corresponding node. The synchronization byte is forwarded to a timer within the interface controller, for example. The timer will ensure that the bytes sent across the network are synchronized with the switch in order to appropriately route data to the destination or target at appropriately timed byte boundaries.

The four time slots shown in FIG. 2 are applicable to a single frame. It is understood, however, that multiple frames are sent in sequence. Each frame maintains transmission of time slots and channels according to the routing tables. As devices are brought on-line, the routing tables are updated and time slots are allocated. If, for example, a single pair of devices are on-line, then possibly the entire frame can be allocated to a single frame segment to accommodate data transfers between those devices. If the data is streaming, the routing tables are defined to allocate at least one frame segment across all frames sent within the network during times when the streaming source is active. Thus, a frame can be repeated and is sent in sequence to a decoder from, for example, a source device within a node on the network.

There may be instances in which, for example, both a telephone and a CD may be sampling data at the same rate in which the network data is being clocked. In this case, two frame segments or time slots are reserved within each frame for carrying synchronous data. In this example, there certainly can be more than four time slots, with two or more time slots dedicated to receiving synchronous data and, possibly, another two or more dedicated to receiving isochronous data if, for example, a pair of higher or lower sampling rate players can be activated on the network.

Time slots TS0-TS3 are shown merely as an example and are available as corresponding segments within each frame, beginning with frame 1 and ending with frame N. If the network is operating at a lower FSY than a sample rate (fs) of a particular device, then possibly another byte will be needed for the segment carrying isochronous data. A typical example might be a network locked to a CD output sampled at 44.1 kHz attempting to place a DVD player information sampled at 48 kHz. In order to accommodate the higher sampling rate of the DVD drive, an additional byte is placed within the isochronous segment of, for example, time slot TS2.

Regardless of the data type being sent, each channel of data sent across the network is transferred at the same rate. This allows the network to operate synchronously while accommodating what is normally data that is sent asynchronously, or data that is sampled at a higher or lower rate than the network transfer rate (i.e., isochronous data). Each time slot or channel is thereby synchronous with one another. Transferring the channels synchronously is implemented by allocating an additional byte to the synchronous transfer of isochronous data.

While the isochronous data is sent at the same transfer rate as the other channels, a signaling byte is used to identify which of the N bytes (if the sample rate is less than the frame sync rate) or N+1 bytes (if the sample rate is greater than the frame sync rate) in each frame are valid. For example, if the network is operating at 48 kHz and it is desired that a device sample onto the network at 44.1 kHz, then a minimum of 8×44.1/48 bytes/frame or 7.35 bytes/per frame are needed to accommodate an 8 byte per frame isochronous channel. In this example where N=8, a minimum of 8 bytes per frame are needed to accommodate this isochronous data, yet only a portion of the 8 bytes in each frame are actually valid.

The signaling byte will keep track of which of these frames are valid and which are not. Thus, the isochronous data is synchronized off of the signaling byte. For reasons described later, a tag byte can be used to synchronize packetized data, and to indicate where within each frame the packetized data exists and is valid. The signaling byte can be embedded within the data itself and can represent a coding violation, for example. A coding violation dissimilar from, for example, the DCA or DC-free coding of U.S. Pat. No. 6,437,710 will indicate where isochronous, asynchronous, and/or synchronous data are to be placed within each frame by signaling the beginning of a series of bytes which occupy that frame segment, as well as one or more successive frame segments until the end of that message has arrived. The time between when a data code violation occurs will then symbolize a channel, where that channel can encompass different data types.

Figure 3:
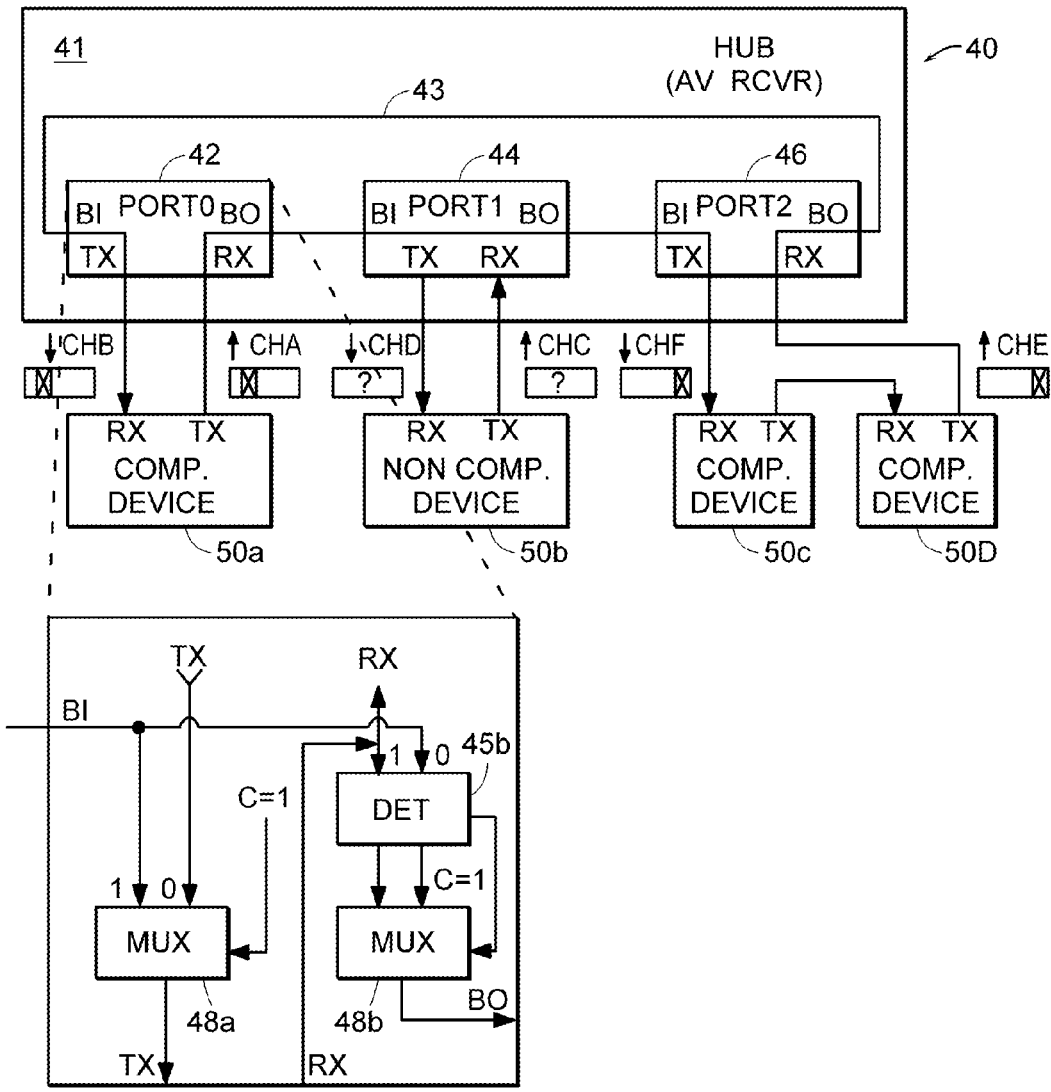
FIG. 3 is a block diagram of complaint and non-compliant devices coupled to ports of a device (such as an audio video receiver) to form a ring network, with a port shown in detail for transferring compliant data onto and from the network.

FIG. 3 illustrates a synchronous network 40 of interconnected ports 42, 44, and 46 that form inputs/outputs of a device, such as an AV receiver, or multimedia data hub 41. Ports 42, 44, and 46 are coupled together through bypass out (BO) to bypass in (BI), where the last port 46 of the chained series of ports has a BO coupled to BI of the first port 42 of the series to form a loop, or ring network 43. The loop can be completed when coupling the transmit of port 42 to the receive of device 50a, and then the transmit of device 50a back onto the receive of port 42 via detector and multiplexer circuits. A loop can also be formed through devices 50b, 50c or 50d. As shown, BO of port 42 is connected to BI of port 44, and BO from port 44 is connected to BI of port 46, and BO of port 46 is connected to BI of port 42. For sake of brevity of the drawing, only three ports are shown. However, it is understood that a minimum of two ports is generally desired, but that more than three ports can be used, if needed.

Within each port is a detector (or comparator) 45b and a pair of multiplexers 48a and 48b, as indicated by the detailed, blow up illustration of port 42. Multiplexer 48a receives BI from the network and serial output, TX, from the AV receiver device. Depending on whether the external device 50a is compliant or non-compliant, then multiplexer 48a will select compliant data within BI for input into the RX pin of device 50a, or multiplexer 48a will select non-compliant data from the transmit pin, TX, of device 41 for input into the RX pin of device 50a. Auto detect of the incoming data is not needed, knowing data output on the TX pin of device 41 is non-compliant. Detector 45b and multiplexer 48b are attributed to the BO and RX of the audio-video (AV) receiver device 50a. Transmit output of device 50a is coupled to receive input of port 42. An auto detect is performed by detector 45b, and multiplexer 48b will either send the signal upon the receive input to BO of port 42 or the BI will be sent, depending on whether the incoming data is compliant or not. The incoming RX data is placed on one of the input pins of the detector 45b and multiplexer 48b, with BI placed on the other input pin. The auto detect function is performed within detector 45b to compare the incoming data protocol to the network protocol to determine if the incoming data is from a compliant or non-compliant device.

The incoming data on the RX pin of port 42 is placed into both detector 45b and a receive pin of an interface, which will eventually lead the device 41. The data on BI can be routed to 41, if needed, through a port connecting a controller that receives BI placed on BO. As shown in FIG. 3, the incoming data on ports 42 and 46 are from a compliant device, whereas the incoming data on port 44 is from a non-compliant device. Multiplexer 48a perform similar functions as multiplexer 48b, except that data from the device 41 and BI are selected by multiplexer 48a and, depending on whether the targeted device 50a is compliant or not, either the data from device 41 (via TX of an interface associated with device 41) or BI is placed onto the outgoing data TX of port 42.

Device 50a is a compliant device that sends/receives data according to the network protocol described above, with channel information of channel A placed in the appropriate time slot and, thus, detector 45b and multiplexer 48b will compare and route the appropriate data to the receive pin, RX, associated with an interface of device 41. Thus, the incoming data on the RX pin of device 41 can be processed and coupled internally through an interface circuit and associated transceiver controller via, for example, an $I^2C$ or $I^2S$ port to the BO of port 42 to process the incoming data by device 41, but also to send the incoming data on RX pin or the incoming data BI of the network data to other devices 50b, 50c and/or 50d, if needed. Details of the interface circuit used to couple BO through a controller to the input of device 41 is described below in reference to FIG. 8.

If a device is non-compliant, such as device 50b, then it is uncertain where the data of a particular channel (i.e., channel C) is to be placed since the protocol is unrecognizable to the network protocol, as detected by the auto detect circuitry within device 44. Thus, port 44 receives the incoming signal on the serial input pin as well as the multiplexer. The multiplexer within port 44 will select the BI for coupling onto BO to continue the network, but will allow device 41 to receive the non-compliant data via the serial input pin, SR. Decision on whether the incoming data placed on the RX input is compliant or not is made within, for example, a DSP. Similar to device 50a, devices 50c and 50d are compliant devices that send channel of information within a particular dedicated slot, such as channel E as shown. Devices 50c and 50d can be coupled within the ring to expand the ring network to include more than two devices.

FIG. 3 illustrates in all instances the transfer of compliant data around a network from the TX pin of a second device 50a (or any other external device) into the RX pin of a first device 41, and consequently to another external device 50c of a next, successive device to form the ring. If non-compliant incoming data is received, then the incoming data will not be placed immediately onto the network, but can be placed on the serial input pin of the device and processed according to whatever protocol the incoming data provides and, therefore, is acceptable to the serial input pin designed to handle that non-compliant data.

Figure 4:
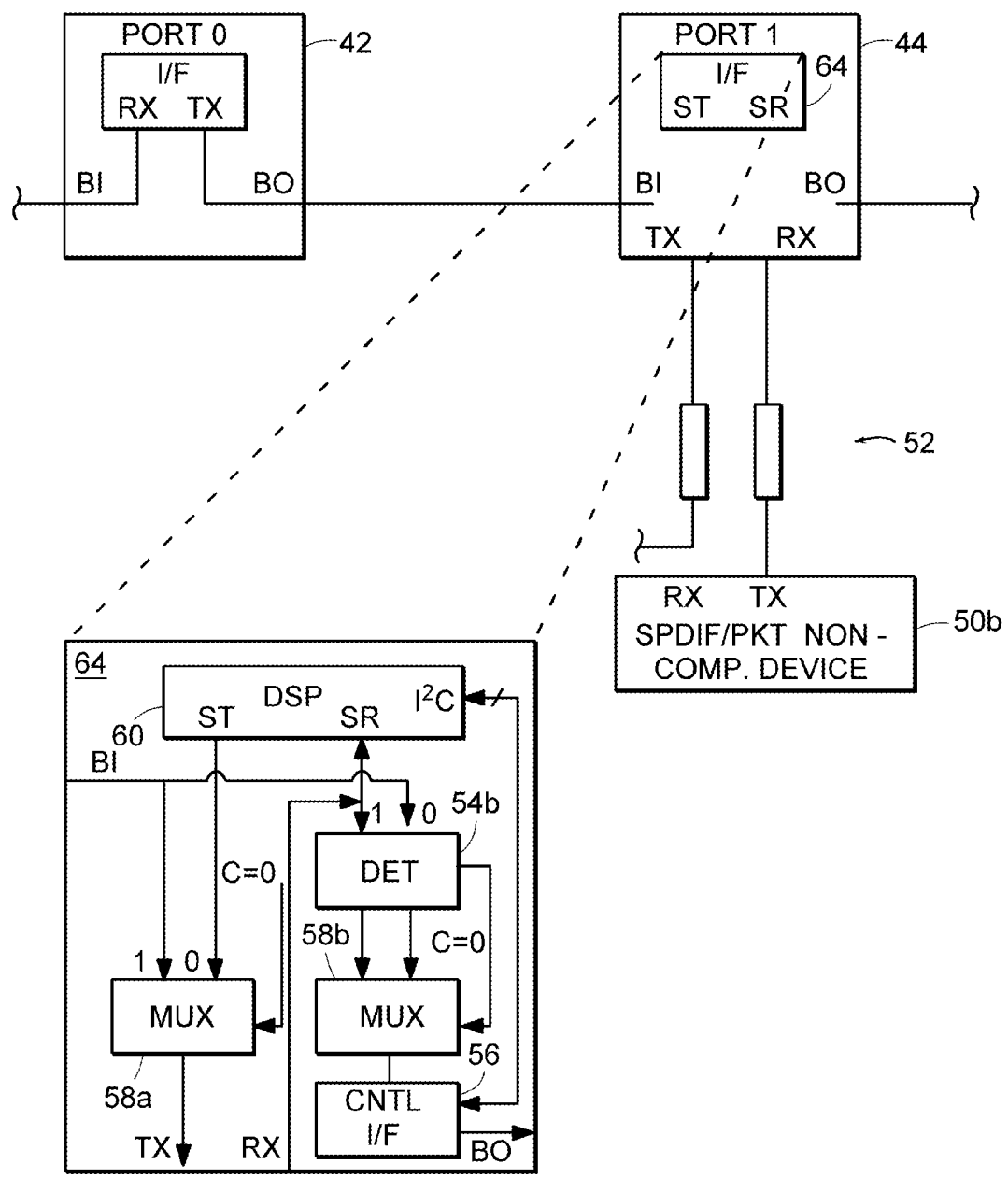
FIG. 4 is a block diagram of a non-complaint SPDIF or packet (driven over Ethernet) device coupled to a port shown in detail for transferring non-compliant SPDIF data into and from a device associated with the port and, if needed, for reformatting the non-compliant data and placing it onto the network.

FIG. 4 illustrates a certain type of non-compliant data, such as SPDIF streaming data or Ethernet packetized data. If the incoming data from the TX pin of a non-compliant device 50b arrives across a transmission channel 52, then the non-compliant (SPDIF or Ethernet) data is compared by detector/comparator 54b with the data sent across the network transmission path. If the protocol is different, then a comparator signal (C) is sent from comparator 54b to select network data from BI to be sent to BO via multiplexer 58b. The incoming RX data is forwarded to the serial receive input (SR) of a DSP associated with device 41, as well as the input of detector 54b. The DSP 60 maintains an input pin capable of accepting non-compliant data, and thus SR can recognize, for example, SPDIF protocol. If device 50b is compliant, however, the compliant information is routed onto BO and, if necessary, is routed to the DSP via, for example the I$^2$C port. DSP 60 can perform operations on the data, depending on whether the data is compliant or not. Included with those operations is to decode the non-compliant data at SR pin and perform any needed functions by the device. Also, if needed, the non-compliant data can be re-formatted by operations of the DSP 60 to make the non-complaint data compliant. Non-compliant data can be sent to the serial transmit output (ST) port and then to a non-compliant external device. If data output from DSP 60 is destined for a compliant device, however, the data is presented to controller 56, which operates to reformat the non-compliant data to an appropriate timeslot and protocol for compliant data and forwards the data across the network via BO. Thus, data from DSP 60 can be formatted through a transceiver interface that includes controller 56. Controller 56 can be integrated together with the auto detector and multiplexers as a single interface, as described in FIG. 8.

Placed between BI and RX is controller 56 that operates not only as a network transceiver to place BI onto the network, but also to place BI into device 41 if device 41 is a destination for compliant data forwarded across the network. Controller 56 takes compliant data and arranges that data into a protocol acceptable to the well known I$^2$C or I$^2$S protocol acceptable to DSP 60. Controller 56, serves as a physical layer device to synchronize and reformat the incoming data of BI to the DSP-recognizable format. The controller can send reformatted data across the I$^2$C bus to DSP 60. Controller 56 thereby affords compliant network data to be placed onto the input of device 41.

Each port thereby includes an interface. Interface 64 of port 44 is illustrated in detail to include multiplexer 58a, 58b, detector 54b, DSP 60 and controller 56. Detector 54b of FIG. 4 performs auto detection functions. In the example of FIG. 4, detector 54b compares the incoming SPDIF protocol to the network protocol, or compares the incoming Ethernet protocol to the network protocol. A counterpart detector is not needed on the transmit side of interface 64 since multiplexer 58a either selects compliant or non-compliant data depending on the status of the external device 50b connected to the TX output of port 64. A configuration register can be programmed to maintain the compliant/non-compliant status of the external device, and thereby provide the appropriate select signal of C=0 or C=1 to the multiplexer depending on whether the external device is non-compliant or compliant, respectively. As shown, the configuration register is programmed to maintain a selection status of 0 to indicate a non-compliant device is coupled to the TX output of port 44 to ensure the serial transmit output (ST) of non-compliant data from DSP 60 is forwarded to non-compliant device 50b. As shown ST can produce SPDIF output data recognizable by the RX pin of external device 50b.

Figure 5:
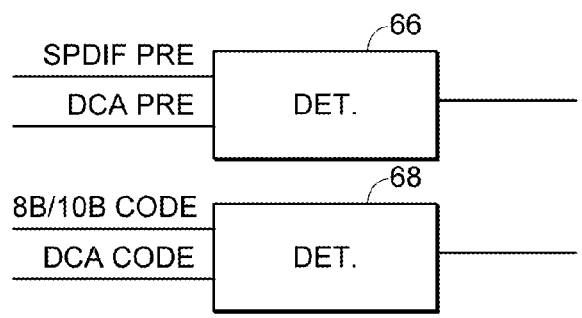
FIG. 5 is block diagram of a comparator used to compare the protocol (preamble or coding) of digital signals from a device coupled to the port to determine whether to forward the digital signals onto the network, or initially into a device associated with the port and then onto the network.

FIG. 5 illustrates two separate detectors: preamble detector/comparator 66 and code detector/comparator 68, which can be used to perform comparison functions of detector 54b. It is recognized that SPDIF protocol does not utilize time-division, multiplexed channels dedicated to each frame of information, and the Ethernet protocol contains coding that is dissimilar from DCA coding or DC-free coding set forth in U.S. Pat. No. 6,437,710.

The 8B/10B code of Ethernet is detected as being dissimilar from DCA code and, therefore, code comparator 68 will send the comparison results to the multiplexer to selectively receive the incoming data or not upon the receive input of a compliant device within the network. Similar to the code comparator 68, preamble comparator 66 compares the preambles of the SPDIF versus network preambles to determine if there is a protocol difference. Both code and preamble comparators determine any protocol differences to denote whether the incoming data will be sent into the serial input pin which is dedicated to receiving the non-compliant data, or whether the incoming data will be placed on the receive input of the port that is connected to the BO of that port for receiving compliant data.

Figure 6:
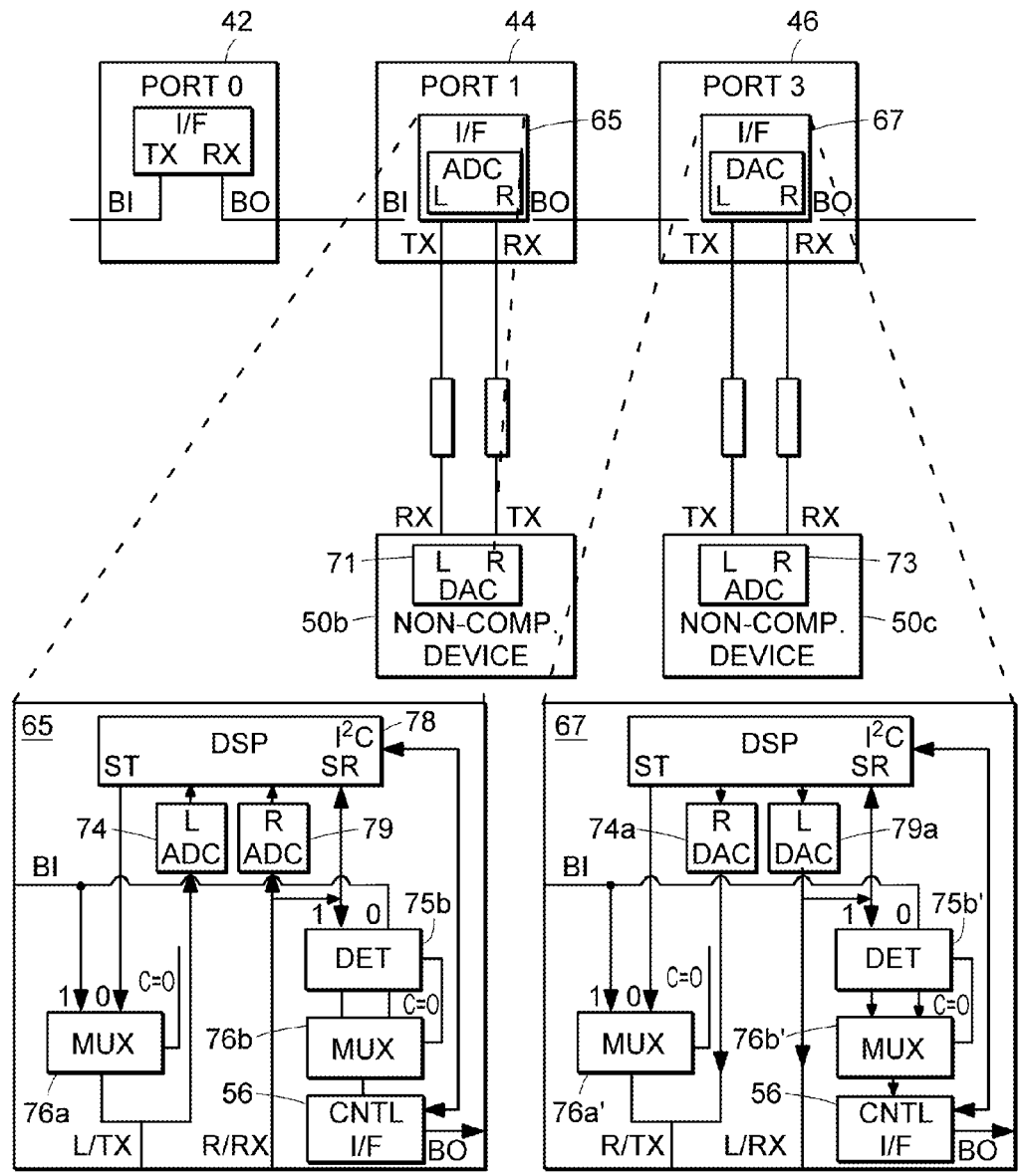
FIG. 6 is a block diagram of a non-compliant DAC device having a left channel output coupled to a transmit pin of a first port and a right channel output coupled to a receive pin of the first port, and then from a second port receive pin coupled to a left channel input and a transmit pin coupled to a right channel input of a non-compliant ADC device, wherein both first and second ports are shown in detail for coupling non-compliant DAC data into a device associated with the port and, if needed, for reformatting the non-compliant data and placing it onto the network and back out to the DAC device.
Figure 7:
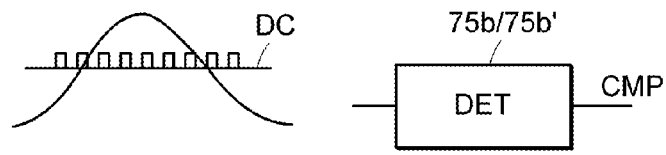
FIG. 7 is a block diagram of a comparator used to compare amplitude or frequency of an analog signal from a device coupled to the port to determine whether to forward the analog signals onto the network, or initially into a device associated with the first port and then onto the network.

FIGS. 6 and 7 illustrate a different type of non-compliant data, which can be analog data. A DAC within device 50b is designed to send left analog audio output data and right analog audio output data, with the right analog audio data being sent from the transmit pin of device 50b into the receive pin of port 44. Receive pin on port 44 is the same pin that receives the right analog audio data from the DAC. The left analog audio data is sent from the receive pin of device 50b to the transmit pin of port 44, as well as the left analog audio input of ADC within interface 65. As shown, ports 42, 44 and 46 are similar to those in FIG. 3; however, within ports 44 is an interface circuit 65 that includes an ADC. Interface circuit 67 includes a DAC. Alternatively, instead of the ADC and DAC circuit within the interface circuits, the ADC and DAC can be within distinct regions of the associated device 41 (FIG. 3).

Similar to ADC and DAC circuits within interface circuits 65 and 67 of ports 44 and 46, counterpart DAC 71 and ADC 73 can be placed in non-complaint devices 50b and 50c. Importantly, the left and right analog audio data of an ADC are placed on the left and right analog audio pins that are shared with the transmit and receive pins, respectively. Conversely, the left and right analog audio data of a DAC are placed on the left and right analog audio pins that are shared with the receive and transmit pins, respectively. In this fashion, a left/right audio information can be sent from a DAC to a left/right pins (and transmit/receive pins) of a port associated with an ADC. Left and right information sent by the DAC can be returned by the ADC, and the transmit/receive right/left convention on the DAC is therefore consistent with the receive/transmit right/left convention on the ADC to form a virtual loop network between the ADC and DAC for sending and receiving analog audio information. As shown in FIG. 6, the ADC can be associated with a port of a first device or can be within a second device connected to the first device via the port. The same applies to the DAC.

Also included in FIG. 6 is a detailed view of interface circuits 65 and 67, with the ADC and DAC broken out into separate left and right ADCs and DACs. The left analog audio channel is coupled into the left ADC 74. Multiplexer 76a is coupled to select either serial transmit output (ST) from the DSP or BI from the network. Thus, digital representations of a left analog audio channel can be selected and sent to the L/TX pin of port 44 or, alternatively, network data within BI can be sent to the L/TX pin. The analog audio left and right channels can be forwarded from the ADCs to the DSP 78, which can be placed in digital form and either sent onto the network via controller 56 or output via L/TX pin of port 44 depending on whether the external device coupled to port 44 is compliant or non-compliant. The incoming right analog audio channel operates similar to the left channel in that a right ADC 79 is used to receive the incoming data and detector 75 determines whether the data is compliant and, if not, then multiplexer 76 will place BI onto BO. The analog data, left and right channels, is forwarded onto DSP 78 and then onto the internal device associated with port 44 via interface 65.

Similar to interface 65, another interface 67 has similarly situated circuit elements and, in particular, left and right DACs broken out separately from each other. The DACs 74a and 79a receive the incoming data, and form the conversion. A multiplexer 76a' is shown and operates similar to multiplexer 76a. The same is said for multiplexer 76b' and detector 75b' operating similar to multiplexer 76b and detector 75b. A driver circuit can be provided in each interface to drive compliant data from the network via BI back out to the connected device if the appropriate select signal is provided via the configuration registers. As shown in FIG. 6, the select signal C has been set of 0 to indicate selection of ST output from the DSP to be placed into the non-compliant receive input of devices 50b and 50c. If devices 50b and 50c were compliant, then the select signal C would be set to 1 to indicate selection of BI for placement into their receive inputs.

FIG. 7 illustrates detector 75b/75b' used to compare the frequency of the incoming analog signal to the network transfer rate of compliant data sent across the network between ports. Typically, the digital data sent across the network between BI and BO, and between neighboring BO and BI, is multiples of FSY, where FSY is either 44.1 or 48 kHz. The analog signal is typically sent at frequencies less than 30 kHz. The DC bias of the digital signal can be adjusted upward and sent across the network, whereas the DC bias of the analog signal is essentially zero. Adjusting the DC bias forms a distinction if amplitude comparison is desirable over frequency. Detector 75a/75a' is used to determine whether the digital signal sent from the DSP is compliant with the network protocol and thus to place it on the network or to forward it to the non-compliant external device.

Figure 8:
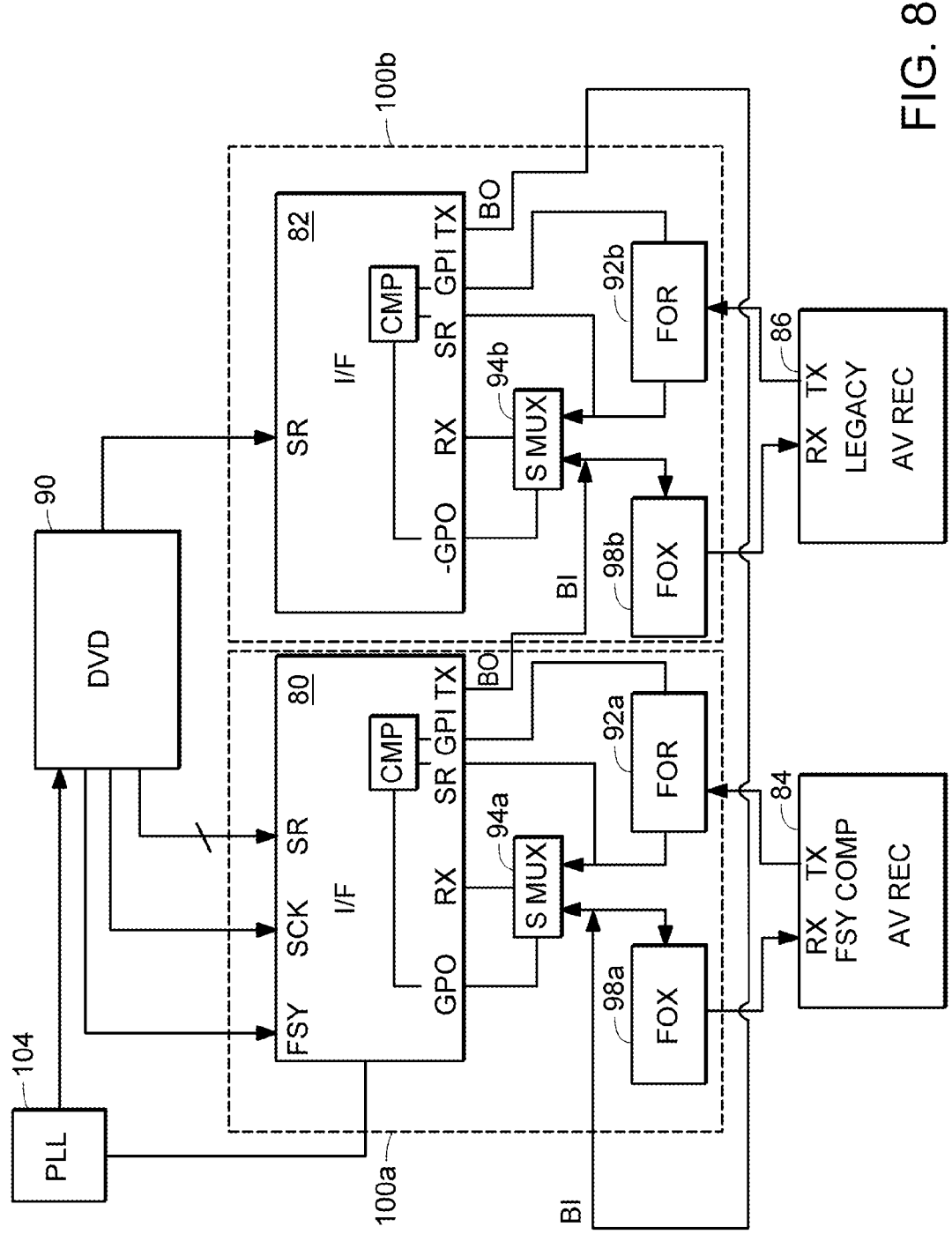
FIG. 8 is a block diagram of a DVD device having a pair of ports through which compliant and non-compliant data can be sent from an AV receiver device, according to one exemplary configuration.

FIG. 8 illustrates two interface units 80 and 82 having embedded in them controller 56, and the transmit pin of one interface is essentially connected to the receive pin of another interface, as shown, by a multiplexer. Of course, the interface units 80 and 82 can be integrated together as one unit if needed. Connection of the transmit and receive pins affords a daisy chain or ring topology to be formed between interface circuits 80 and 82 of ports 100a and 100b, respectively. In addition, interface 80 and 82 are coupled to form a hub on which a device ("second device") can send data. Furthermore, in addition to a second device 84, and third device 86 can be connected to first device 90. The second and third devices shown, in this example, are audio-video receivers 84 and 86. The auto non-compliant detection feature enables legacy consumer equipment, such as CD players, DVD players, and the like, to be connected into a compliant network, and to transfer across the network at a fixed rate to support a variety of sample rate source material, such as 44.1 kHz and 48 kHz audio and video information.

The audio-video receiver (compliant or non-compliant) can play audio and video information placed into the network from a DVD player 90, or SPDIF information sent from DVD player 90 via interface 82. The information can be sent over an I²C port or I²S port to the serial receive, SR, input of interface 80 or 82, depending on whether the destination audio-video receiver is compliant or not. The controller within the interface unit will synchronize the incoming data and perform other physical layer functions on the incoming data. Audio-video receiver 84 and/or 86 can send optical information, for example, into a fiber optic receiver (FOR) 92a and 92b.

To implement auto SPDIF detection, the non-compliant data output from legacy device 86 is also connected to the SPDIF serial input, SR, pin of interface 82. This pin is configured to receive the SPDIF data. When SPDIF is detected, the input multiplexer state is switched to pass the BI from interface 80 onto the RX input of interface 82. Thus, when a SPDIF device 86 is connected, the ring is maintained and, specifically, the communication from one device to the other across the network is maintained. Information from the network can be transferred back out from the network onto the third device 86 via a fiber optic transmitter (FOX) 98b.

Labeled in dashed line are two ports 100a and 100b corresponding to first device, e.g., DVD 90. Port 100a is dedicated to receiving network information as well as compliant data from a compliant device 84. Port 100b, however, is dedicated to receiving both network information and non-compliant data from device 86. In the example shown, the SPDIF input is recovered by an asynchronous source port, labeled as the serial receive (SR) port. Along with the controller, the detector/comparator described above can be integrated into the interface to performs the comparison, and then a multiplexer is shown to multiplex the appropriate signal onto the receive pin of the interface. If the SPDIF data is to be received, the SPDIF data is transported unlocked isochronously to an asynchronous serial receive port (SR), where the controller within the interface 82 performs synchronization using a PLL, or other means described below.

Multiplexers 94a and 94b will connect the optical receiver data out signal to the receive input of interface 80/82 only if light is detected and SPDIF data is not detected. The status signal of the optical receiver is connected to the general purpose input/output of the interface. If this indicates that light is detected, then the interface will monitor the SPDIF lock detector within the corresponding interface unit. If lock is not detected within a certain timeframe, then the optical receiver data out is connected to the receive (RX) input. SPDIF input may be at 48 kHz or 44.1 kHz, whereas the network may be locked to 48 kHz. Software automatically determines the frequency differences and the comparator determines any preamble differences.

DVD player 90 is typically synchronized to a 27 MHz clock derived from a PLL 104. DVD player 90 provides preferably 96/48 kHz or 88.2/44.1 kHz audio data. When the DVD rate and the network rate are not equal, the DVD data is transported in locked isochronous mode. Then the DVD and network rates are the same, the DVD data is transported synchronously. The maximum data from the DVD is approximately six channels, 24 bit, and 96 kHz. Simultaneously, the DVD provides AC3 encoded data over SPDIF, which is equivalent to CD audio bandwidth. All six channels of 96 kHz audio plus the AC data can be transported in three isochronous streams simultaneously. The interface 80/82 will process six channels of 96 kHz audio and packs those channels into two isochronous channels, while one DSP on one of the interfaces will pack AC3 into another isochronous channel.

Figure 9:
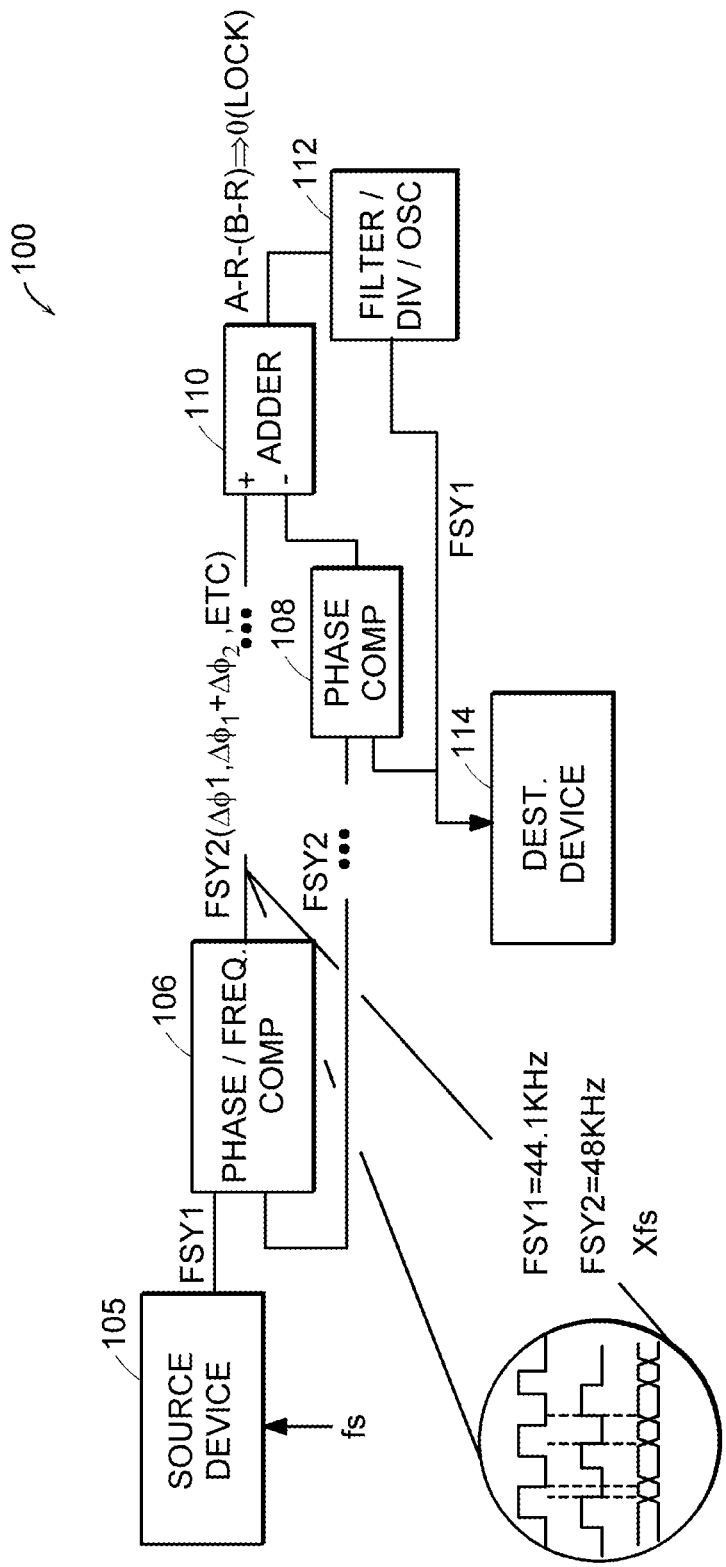
FIG. 9 is a block diagram of a source device driving sampled data into a source port having a phase and/or frequency comparator and forwarding unlocked isochronous data along with phase and/or frequency differences between the source sample rate and the network frame rate across the network where a destination port implements a digital PLL to lock a destination sample rate from the phase and/or frequency difference.

Transporting data unlocked isochronously typically involves a digital PLL at the destination device. Thus, PLL 104 (FIG. 8) can be a digital PLL which formulates the serial clock or sample rate of the destination device from FSY, and the frequency or phase difference between FSY and the sample clock at the source device. FIG. 9 indicates the unlocked isochronous transport mechanism. Instead of sample rate converting at the source device, FIG. 9 indicates a digital PLL at the destination 114. Source device 105 can be sampled at fs and comparator 106 can compare the network frame rate FSY to the sample rate of fs=FSY1. The phase difference $\Delta\Phi1$ or the phase difference at time 1 and time 2 ($\Delta\Phi1+\Delta\Phi2$) can be sent across the network as a single bit or multi-bit byte. The phase difference or $\Delta\Phi1$ can have a different bit value depending on the phase difference magnitude.

The sample data can, therefore, be sent as isochronous data at the frame transfer rate of FSY2, but possibly with an additional byte reserved in each frame to accommodate a faster FSY1 relative to FSY2. In this fashion, the streaming data is maintained across each of the successive frames sent across the network.

Comparator 106 compares the phase difference between the leading or falling edges of each frame transfer clock or sample clock. A digital phase comparator 108 can take place using a timer, for example. If three serial bitstreams are used, for example, a high speed clock can be 3072 fs. If, for example, six cycles of 3072 fs separate the trailing edge of FSY1 and FSY2 (noted as $\Delta\Phi 1$), then a byte indicating a binary 6 value is periodically sent across the network. Increasing the clock rate to 24576 fs will significantly increase the resolution of the binary value and, therefore, instead of sending 8 bits periodically, 12 bits can be sent.

The phase difference (e.g., an 8-bit byte or 12-bit byte) is thereafter used by the PLL and the destination port. Adder 110 subtracts the phase difference between FSY1 and FSY2 (represented as A–R), and the phase difference between FSY2 and FSY1 (represented as B–R) to achieve A–R–(B–R). If those differences are 0 and, thus, the digital PLL 104 is locked, then the output from adder 110 will be 0 phase difference placed into a filter, divider, and oscillator network 112. Adder 110 and filter, divider, and oscillator 112 can form a part of a DSP. Phase comparator 108 compares the network transfer frame rate clock edge to the local sampling rate of the destination device, shown as reference B. Reference B is made equal to reference A due to the feedback from digital filter and programmable divider 112. Divider 112 receives a high frequency clock from oscillator 112 that, based on the control output from filter 112, divides the oscillator output to the appropriate frequency and phase needed to lock the local sampling clock B to the source sampling clock A.

A local digital PLL at the destination device allows any streaming data at any frequency to be sent unlocked into the network. It is not until it is received upon destination device 114 will the sampling rate be locked to the sampling rate on the source device 105. Phase and/or frequency differences can be sent across the network along with the isochronous data as unlocked isochronous data. A digital PLL avoids the use of complex sample rate conversion mechanism in the source device, and the overhead of a DSP in that device. Instead, a single PLL can be used in the destination port and thereby allow isochronous data to be sent across the network with clock recovery being used in the destination port in lieu of sample rate conversion, or jitter associated with localized crystal oscillators.

Figure 10:
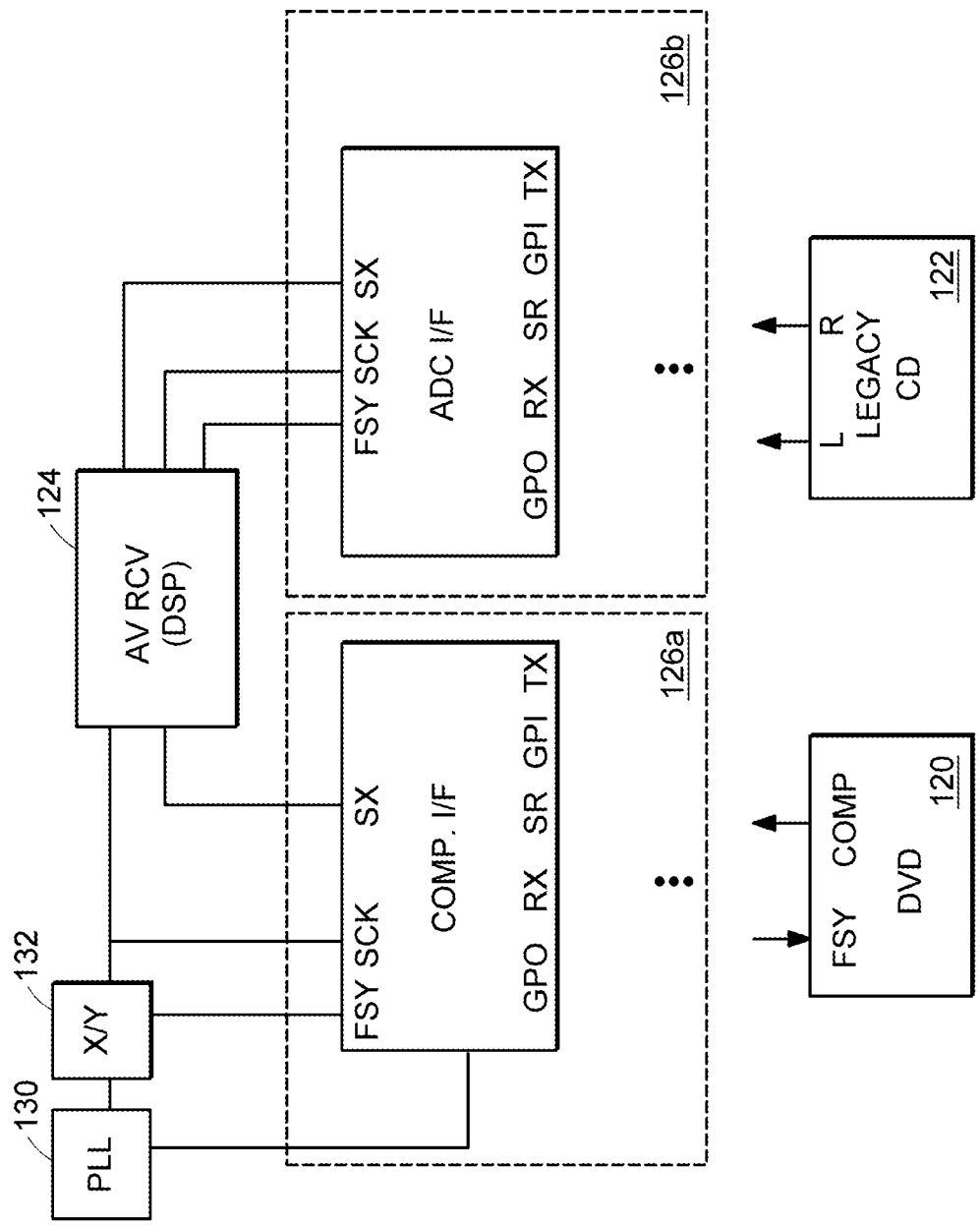
FIG. 10 is a block diagram of an AV receiver device with a pair of ports through which complaint and non-compliant data can be sent from a compliant DVD device and a non-compliant CD device, according to one exemplary configuration.

FIG. 8 illustrates a DVD player 90 sending SPDIF and/or network-compliant data into a network to be received upon a compliant or non-compliant input of an audio-video receiver. Conversely, FIG. 10 illustrates a compliant and non-compliant device sending information into the network, or compliant and non-compliant ports of an audio-video receiver placed within that network. Specifically, FIG. 10 illustrates a compliant DVD player 120 and a non-compliant CD player 122 sending incoming data into a network or compliant/non-compliant ports of an audio-video receiver 124. For sake of brevity, the various details of each port 126a and 126b are not shown. However, it is understood that the fiber optic transmitter and receiver ports, synchronization port, and multiplexers, as well as the functionality of the GPI, SR, and GPO pins of the interface are similar to those shown by ports 100a and 100b of FIG. 8.

A non-compliant or legacy CD might send left and right audio channel outputs into the ADC interface. The ADC interface will then forward the audio information into the DSP of receiver 124 as digital information. Compliant device 120 can also send data into port 126a. Port 126a can then forward the data onto the network, as well as into the DSP of audio-video receiver 124 via the serial transmit pin (SX).

Figure 11:
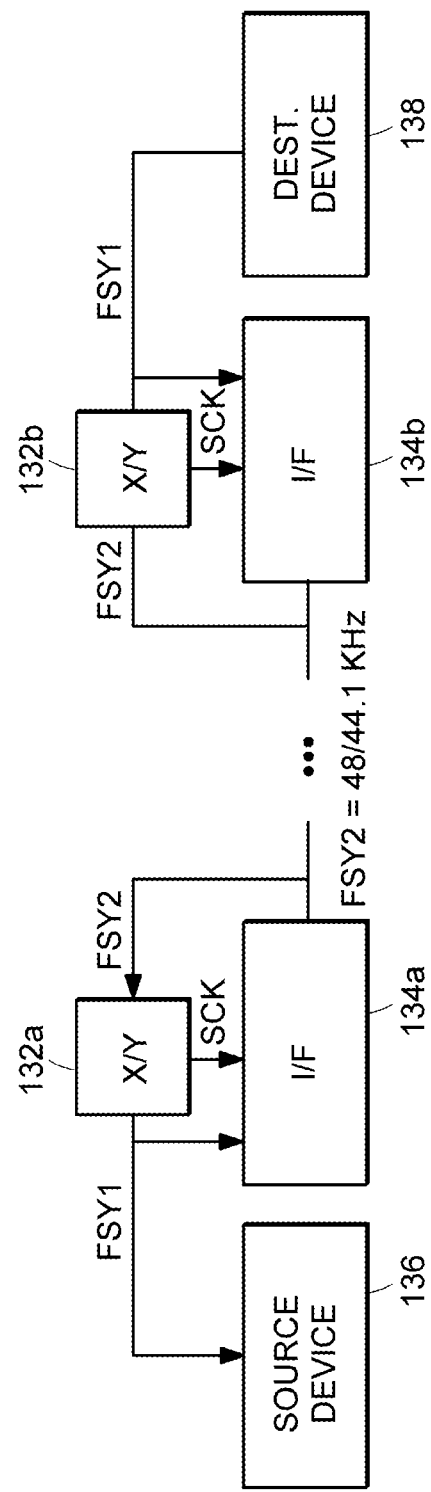
FIG. 11 is a block diagram of a source device driving sampled data into a source port and a destination device that receives the sampled data as locked isochronous data, wherein both the source port and destination port include a PLL that samples at a frequency locked to and proportional to a frame sync frequency of the network.

Serial clock (SCK) and the frame sync clock (FSY) are derived using either the unlocked isochronous transport mechanism of FIG. 9 or a locked isochronous transfer mechanism of FIG. 11. If the source device cannot be slaved to the network timing, for example a digital video broadcast receiver, then the FSY and SCK will most likely be derived from the source device using an unlocked isochronous transport mode, where FSY and SCK will be compiled at the destination device from the source device. However, if the source device does not constitute the clock master and possibly some other device connected to the network operates as the master, then the master will essentially be the network itself. In this fashion, the source device can be slaved from the network master, and the destination device can also be slaved from the network master. In this instance, FIG. 11 illustrates slaving the source and destination devices to the network clock master, where the network frame sync FSY2 is used to compile the source and destination sample rates FSY1=fs.

Referring to FIGS. 10 and 11 in conjunction, PLL 130 at the destination is shown in FIG. 10. Associated with PLL 130 is a divider and multiplier 132. Divider and multiplier 132 will divide and multiply the frequency by an X/Y factor relative to the network transfer rate of FSY2. Instead of a separate divider and multiplier, PLL 130 can have a fractional divider 132. The fractional divider or separate divider and multiplier 132 can actually be made a part of and integrated with multimedia device 124.

Referring to FIG. 11, if the network frame sync FSY2 is 48 kHz and the source and destination sample rate is 44.1 kHz, then a cumulative ratio of 147/160 for the divider multiplier 132a and 132b occurs. However, if the network frame rate if 44.1 kHz and the source and destination sample rate is 48 kHz, then the cumulative ratio is 160/147 within divider multiplier 132a and 132b. As part of a DVD drive, a system controller will control the drive, decode the audio and video information, and convert the audio information to analog, while sending the uncompressed video to a display.

The controller is typically clocked by a local 27 MHz crystal oscillator. Alternatively, the crystal can be deactivated and the controller can be clocked from a 27 MHz clock that is derived from FSY2. The controller is within interface 134a and 134b. As audio data is read from the drive, it is decompressed in the case of a movie and, if necessary, is forwarded to a DAC. The sample rate of the DAC is fixed and unchanged, it is generated directly or implicitly from the 27 MHz reference. As an example, a PLL with a frequency conversion ratio of 2/1125 will convert the 27 MHz reference clock of the controller to the 48 kHz sample clock needed to sample the audio data from the drive. A conversion ratio of 49/30000 will convert 27 MHz to 44.1 kHz. Thus, source device 136 and destination device 138 can receive data sampled at almost any frequency, as well as the rate at which the controllers within interface 134a and 134b operate. Thus, the serial clock and the sample rates can be adjusted based on the divide and multiply factors of the local PLLs within both source and destination nodes. A locked isochronous transport mode can, therefore, be achieved.

Numerous variations and modifications will become apparent to those skilled in the art once the above disclosure is fully appreciated. It is intended that the following claims be interpreted to embrace all such variations and modifications.

What is claimed is:

1. A communication system, comprising:
a first multimedia device having a first port that includes a first port receive input, a first port transmit output, a first port bypass input, and a first port bypass output;
a second multimedia device having a second port that includes a second port receive input and a second port transmit output;
wherein the first port receive input and second port transmit output are coupled to transfer digital data and right analog audio data;
wherein the second port receive input and first port transmit output are coupled to transfer digital data and left analog audio data; and
wherein the first multimedia device further includes a third port that includes a third port bypass input and a third port bypass output, wherein the first port bypass output is coupled to the third port bypass input; and
wherein the first port further comprises a serial input pin of a processor, and a multiplexer coupled to receive the digital data and to transfer the digital data to the first port bypass output if the digital data is compliant with a protocol by which data is transferred between the first port bypass output and the third port bypass input, otherwise the digital data is sent to the serial input for processing by the processor.

2. The communication system as recited in claim 1, wherein the right analog audio data and left analog audio data are transferred concurrently.

3. The communication system as recited in claim 1, wherein the first multimedia device includes at least one pin (i) into which right analog audio data and digital data are received, (ii) from which right analog audio data and digital data are transmitted, (iii) into which left analog audio data is received and from which digital data is transmitted, or (iv) from which left analog audio data is transmitted and into which digital data is received.

4. The communication system as recited in claim 1, wherein the first multimedia device includes at least one pin (i) into which left analog audio data and digital data are received, (ii) from which left analog audio data and digital data are transmitted, (iii) into which right analog audio data is received and from which digital data is transmitted, or (iv) from which right analog audio data is transmitted and into which digital data is received.

5. The communication system as recited in claim 1, wherein the first multimedia device comprises an analog-to-digital converter, and wherein the second multimedia device comprises a digital-to-analog converter, or vice versa.

6. The communication system as recited in claim 1, wherein the first port further includes:
a comparator that compares a frequency of the digital data with a frequency of the right analog audio data; and
a multiplexer coupled to the comparator for transferring the digital data to the first port bypass output if the comparison result indicates a DC bias associated with the digital data and the digital data is compliant with a protocol by which data is sent from the first port bypass output to the third port bypass input, otherwise a connection is made between the first port bypass input and the first port bypass output.

7. The communication system as recited in claim 1, wherein the first port further includes:
a comparator that compares a DC bias upon the digital data with a DC bias upon the left or right analog audio data; and
a multiplexer coupled to the comparator for transferring the digital data to the first port bypass output if the comparison result indicates a DC bias associated with the digital data and/or the digital data is compliant with a protocol by which data is sent from the first port bypass output to the third port bypass input, otherwise a connection is made between the first port bypass input and the first port bypass output.

8. The communication system as recited in claim 1, wherein the first port further comprises:
an input of a pair of analog-to-digital converters coupled to receive the left and right analog audio data; and
a processor coupled to an output of each of the pair of analog-to-digital converters.

9. The communication system as recited in claim 8, wherein the third port further comprises:
another processor for receiving digitally converted said pair of left and right analog audio data; and
a pair of digital-to-analog converters coupled to convert the digitally converted said pair of left and right analog audio data.

10. The communication system as recited in claim 9, wherein the first port further comprises:
an interface circuit coupled between the pair of analog-to-digital converters and the first port output for converting the digitally converted said right and left analog audio data to compliant data and forwarding the compliant data to the third port input as synchronous or isochronous data.

11. The communication system as recited in claim 1, wherein the protocol comprises synchronous data, packetized data, isochronous data and control data sent in time-division multiplexed time slots within each frame of data sent at the same transfer rate across the network.

12. The communication system as recited in claim 1, wherein the protocol comprises DC-free encoded data.

13. The communication system as recited in claim 1, wherein the protocol comprises frames of data transferred at either 48 kHz or 44.1 kHz.

14. The communication system as recited in claim 1, wherein the serial input pin is adapted to accommodate Sony/Philips Digital Interface Format (SPDIF) data.

15. The communication system as recited in claim 1, wherein the serial input pin is adapted to accommodate a serial bitstream of TCP/IP data.

* * * * *